(12) United States Patent
Kowalewski

(10) Patent No.: US 8,965,424 B2
(45) Date of Patent: Feb. 24, 2015

(54) SERVERS, COMMUNICATION DEVICES, METHODS FOR CONTROLLING A SERVER, AND METHODS FOR CONTROLLING A COMMUNICATION DEVICE

(75) Inventor: Frank Kowalewski, Goettingen (DE)

(73) Assignee: Intel Mobile Communications GmbH, Neubiberg (DE)

(*) Notice: Subject to any disclaimer, the term of this patent is extended or adjusted under 35 U.S.C. 154(b) by 174 days.

(21) Appl. No.: 13/597,397

(22) Filed: Aug. 29, 2012

(65) Prior Publication Data
US 2014/0066108 A1    Mar. 6, 2014

(51) Int. Cl.
H04W 4/14    (2009.01)

(52) U.S. Cl.
USPC ............... 455/466; 455/412.1; 455/412.2; 455/414.1; 455/550.1; 455/422.1; 370/329; 370/349; 370/471

(58) Field of Classification Search
USPC ............ 455/466, 412.1, 412.2, 414.1, 550.1, 455/556.2; 370/49, 329, 471, 474–475, 466
See application file for complete search history.

(56) References Cited

U.S. PATENT DOCUMENTS

2005/0117602 A1*  6/2005  Carrigan et al. ............ 370/466
2011/0080905 A1   4/2011  Greene

FOREIGN PATENT DOCUMENTS

WO    03103308 A1   12/2003
WO    2009127873 A1 10/2009

OTHER PUBLICATIONS

J. Rosenberg et al. IETF request for comments RFC 3261, "SIP: Session Initiation Protocol", Jun. 2002, pp. 1-269.
http://en.wikipedia.org/wiki/IP_Multimedia_Subsystem, pp. 1-23, Aug. 31, 2012.
3GPP technical specification TS 22.228 "Service Requirements for the Internet Protocol (IP) Multimedia core network Subsystem (IMS)", Stage I, Release 11, V. 10.3.0, Jun. 2011, pp. 1-39.
3GPP technical specification TS 22.090, "Unstructured Supplementary Service Data (USSD)"—Stage 1, Release 9, V9.0.0., Dec. 2009, pp. 1-10.
3GPP technical specification TS 31.115, "Secured packet structure for (Universal) Subscriber Identity Module (U)SIM Toolkit applications", Release 10, V10.0.0, Apr. 2011, pp. 1-18.
3GPP technical specification TS 23.204, "Support of Short Message Service (SMS) over generic 3 GPP Internet Protocol (IP) access; Stage 2", Release 11, V11.1.0, Sep. 2011, pp. 1-53.
3GPP technical report TR 23.863, "Support of Short Message Service (SMS) in IMS without MSISDN; Stage 2", Release 11, V1.0.0., Dec. 2011, pp. 1-56.
3GPP TR 23.863, SA WG2, V1.4.0; 3rd Generation Partnership Project; Technical Specification Group Services and System Aspects; Support of Short Message Service (SMS) in IMS without MSISDN; Stage 2 (Release 11); XP050648992; Jul. 23, 2012; pp. 1-68.
European Search Report and Opinion received for European Patent Application No. EP13182043, mailed Mar. 12, 2013, 8 pages.

* cited by examiner

*Primary Examiner* — Babar Sarwar
(74) *Attorney, Agent, or Firm* — Schwabe, Williamson & Wyatt, P.C.

(57) ABSTRACT

A server may be provided. The server may include: an association circuit configured to associate with a first address according to a first address scheme according to a communication control protocol, by which a communication device may be addressed, a second address according to a second address scheme, by which the communication device may not be addressed.

23 Claims, 6 Drawing Sheets

800

Associate with a first address according to a first address scheme according to a communication control protocol, by which a communication device may be addressed, a second address according to a second address scheme, by which the communication device may not be addressed — 802

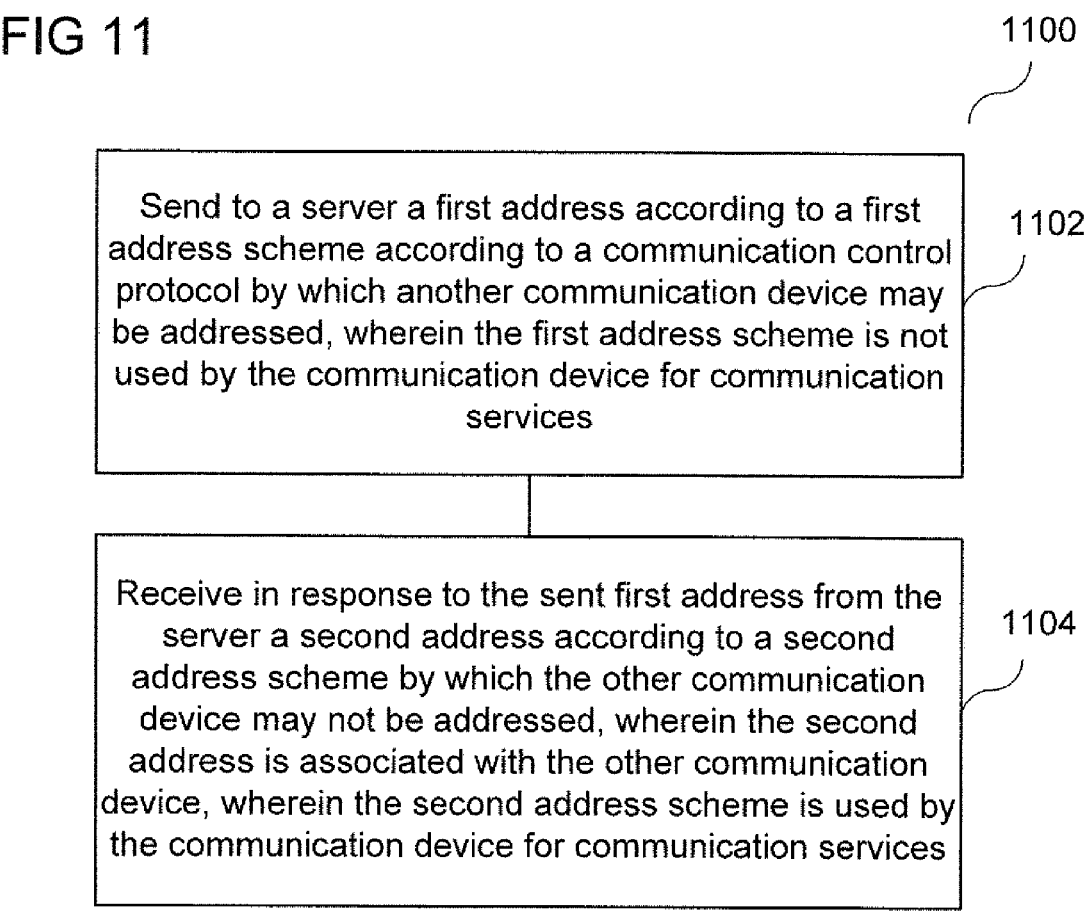

SERVERS, COMMUNICATION DEVICES, METHODS FOR CONTROLLING A SERVER, AND METHODS FOR CONTROLLING A COMMUNICATION DEVICE

TECHNICAL FIELD

Aspects of this disclosure relate generally to servers, communication devices, methods for controlling a server, and methods for controlling a communication device.

BACKGROUND

Short messages may be sent using short message service (SMS). However, not all communication devices may be addressed using the same address scheme.

SUMMARY

A server may be provided. The server may include: an association circuit configured to associate with a first address according to a first address scheme according to a communication control protocol, by which a communication device may be addressed, a second address according to a second address scheme, by which the communication device may not be addressed.

A server may be provided. The server may include: a storage configured to store an association of a first address according to a first address scheme according to a communication control protocol, by which a communication device may be addressed, with a second address according to a second address scheme, by which the communication device may not be addressed; and a forwarding circuit configured to forward data addressed to the second address to the communication device using the first address based on the stored association.

A server may be provided. The server may include: a storage configured to store an association of a first address according to a first address scheme according to a communication control protocol, by which a communication device may be addressed, with a second address according to a second address scheme, by which the communication device may not be addressed; and a forwarding circuit configured to forward data received from the communication device using the second address as a sender address based on the association.

A communication device may be provided. The communication device may include: a first address sender configured to send to a server a first address according to a first address scheme according to a communication control protocol by which another communication device may be addressed, wherein the first address scheme is not used by the communication device for communication services; and a second address receiver configured to receive in response to the sent first address from the server a second address according to a second address scheme by which the other communication device may not be addressed, wherein the second address is associated with the other communication device, wherein the second address scheme is used by the communication device for communication services.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 11 shows a flow diagram illustrating a method for controlling a communication device.

DESCRIPTION

Figure 1:
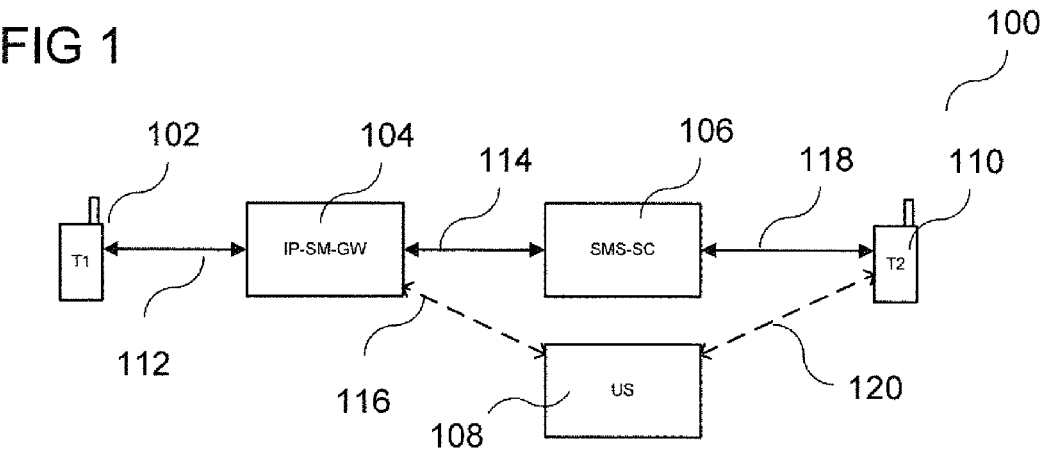
FIG. 1 shows a communication system architecture for short message service.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspects of this disclosure or designs.

The term "protocol" is intended to include any piece of software, that is provided to implement part of any layer of the communication definition.

A communication device (which may also be referred to as end device) may be a wired communication device. A communication device may be a radio communication device. A radio communication device may be an end-user mobile device (MD). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a phone, a mobile station (MS) or an advanced mobile station (advanced MS, AMS), for example in accordance with IEEE 802.16m.

The communication device may include a memory which may for example be used in the processing carried out by the communication device. The server may include a memory which may for example be used in the processing carried out by the server. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

In Public Land Mobile Networks (PLMN) addressing may be done using dialing numbers (for example MSISDNs=Mobile Subscriber Integrated Services Digital Network Numbers).

PLMN end devices may store symbolic strings associated with dialing numbers. The symbolic strings may be used to look up corresponding dialing numbers or to use corresponding dialing numbers for addressing communication partners. The symbolic strings may be device specific and may be stored in the device's phonebook.

Internet based communication services may utilize symbolic addresses. For example, SIP (Session Initiation Protocol) based services like VoIP (Voice over IP) and Email may utilize symbolic addresses.

The IP Multimedia Subsystem (IMS) may be based on SIP and may utilize symbolic SIP URIs (Uniform Resource Identifiers) as addresses.

The IMS may provide the legacy services "voice call" and "SMS" (Short Messaging Service).

Short message data being sent between IP-based end devices and non-IP-based end devices may be translated between IP-based and non-IP-based SMS protocols by an IP-Short-Message-Gateway (IP-SM-GW). Both IP-based and non-IP-based end devices may be addressed by their MSISDN.

IP-based SMS supporting end devices may not have an assigned MSISDN. SMS interworking between end devices only supporting MSISDNs for SMS addressing and end devices not having an MSISDN may for example be provided by inserting non-MSISDN addresses in SM payloads.

IMS SIP addresses may usually indicate the service providing operator's domain. IMS Network-Independent Public User Identities (INIPUIs) that don't indicate the operator's domain may be provided.

Unstructured supplementary service data (USSD) may be exchanged between PLMN communication end devices and their networks.

In USSD Man Machine Interface mode (MMI mode) the transmitted data may be used to exchange generic information between end devices and networks. For example, an end device may transmit data to request special services from the network and the network may transmit information data to be displayed by the end device.

In USSD application mode the transmitted data may be used to exchange application specific information between end devices and networks. For example, information may be exchanged for controlling a network based voice mail box.

A USSD message may contain up to 182 7 bit characters. For larger payloads USSD data may be concatenated.

USSD data may be immediately transmitted (without store and forward).

In commonly used approaches, drawbacks may be:
Supporting address schemes other than MSISDNs by inserting non-MSISDN addresses in SM payloads may reduce the SM payload available for SMS texts;
Supporting address schemes other than MSISDNs by inserting non-MSISDN addresses in SM payloads may not allow to reply to non-MSISDN end devices by current reply mechanisms;
Address schemes with larger address spaces than MSISDNs may not be supported by directly mapping the address scheme to MSISDNs;
Non-digit characters may not be used for addressing in communication devices that are using MSISDN addressing;
No automatic reply may be possible to communications from devices whose address scheme is not supported by a communication device;
Communication devices that only support addressing of MSISDN communication devices may not be used for sending SMs to MSISDN-less communication devices;
Communication devices that only support addressing of MSISDN communication devices may not be used for dialing MSISDN-less communication devices; and
Communication devices that only support addressing of MSISDN communication devices may not address all IMS devices.

Devices and methods for enabling usage of address schemes not supported by a communication device with the communication device may be provided.

Devices and methods may be provided that fulfill the following:
Allow to use address schemes with larger address space than the address space supported by a communication device;
Allow to use address characters that are not allowed for the address scheme supported by a communication device;
Allow automatic reply to communications from devices whose address scheme is not supported by a communication device;

May be used for sending SMs to MSISDN-less communication devices by communication devices that only support addressing of MSISDN communication devices;

May be used for dialing MSISDN-less communication devices by communication devices that only support addressing of MSISDN communication devices;

May be used with IMS services;

May be used with IMS Network-Independent Public User Identities (INIPUI);

May be used with existing end devices;

Allow for transparent user experience; and

Do not require new protocols or protocol extensions.

An association of a non-MSISDN address with an MSISDN by means of USSD may be provided. A phonebook entry for association on an end device may be provided by means of USSD. Reuse of associated MSISDNs for different subscribers may be provided. Associations depending on the subscriber may be provided. Address mapping by a network may be provided. Subscriber dependent number mapping may be provided.

Devices and methods may be provided for associating addresses other than MSISDNs with MSISDNs. The associations may be subscriber dependent.

Support of address schemes other than MSISDNs may not reduce the SM payload available for SMS texts.

Support of current reply mechanisms for replying to non-MSISDN end devices may be provided.

Devices and methods may allow the usage of address schemes other than the address scheme supported by a communication device.

Devices and methods may allow to use address schemes with larger address space than the address space supported by a communication device.

Devices and methods may allow to use address characters that are not allowed for the address scheme supported by a communication device.

Devices and methods may allow automatic reply to communications from devices whose address scheme is not supported by a communication device.

Devices and methods may be used for sending SMs to MSISDN-less communication devices by communication devices that only support addressing of MSISDN communication devices.

Devices and methods may be used for dialing MSISDN-less communication devices by communication devices that only support addressing of MSISDN communication devices.

Devices and methods may be used with IMS services.

Devices and methods may be used with IMS Network-Independent Public User Identities (INIPUI).

Devices and methods may be used with existing end devices.

Devices and methods may allow for transparent user experience.

Devices and methods may not require new protocols or protocol extensions.

Devices and methods may be provided for associating addresses other than MSISDNs with MSISDNs, whereby the associations may be subscriber dependent. This may mean that different subscribers may use the same MSISDN for different associated addresses.

When the network receives communication data destined to a subscriber for which associations have been defined, the network may map originating addresses included in the communication data to the MSISDNs associated with the originating addresses.

When the network receives communication data originating from a subscriber for which associations have been defined, the network may map terminating addresses included in the communication data to the MSISDNs associated with the terminating addresses.

Communication end devices may request associations by means of USSD. An association may be stored in the network for later use to map between the non-MSISDN addresses and the associated MSISDNs.

The network may define phonebook entries for associations on communication end devices by means of USSD.

Communication end device applications may automatically request address associations without user intervention when sending communication data to devices addressed by non-MSISDN addresses.

Association deletions may be requested by means of USSD by the network for end device phonebooks or by end devices for associations stored in the network.

The network may automatically create phonebook entries for associated addresses if an end device is being used for the first time by a subscriber with address associations.

FIG. 1 shows a communication system architecture 100 for short message service. The communication system supporting SMS may support IP-based and non-IP-based end devices. SMs (short messages) may be routed via an SMS service center SMS-SC 106. SMs from and to non-IP-based end devices may directly be routed via the service center 106. SMs to and from IP-based end devices may be routed via an IP short message gateway IP-SM-GW 104 and the service center SMS-SC 106.

Two end devices may be connected to the system. A first end device T1 (terminal 1) 102 of user U1 may be an IP-based phone without an MSISDN. It may be connected to the gateway IP-SM-GW 104 like indicated by arrow 112. A second end device T2 110 of user U2 may be a non-IP-based legacy phone with an MSISDN. T2 110 may be connected to the service center SMS-SC 106, like indicated by arrow 118.

The communication system may also include a USSD server US 108 for supporting USSD (like indicated by arrow 120) for end device T2 110.

The IP-SM-GW 104 and the SMS-SC 106 may be connected, like indicated by arrow 114. The USSD server US 108 may be connected to the IP-SM-GW 104, like indicated by arrow 116. SMS connections 112, 114 and 118 are indicated by continuous arrows in FIG. 1. USSD connections 116 and 120 are indicated by dashed arrows in FIG. 1.

Figure 2:
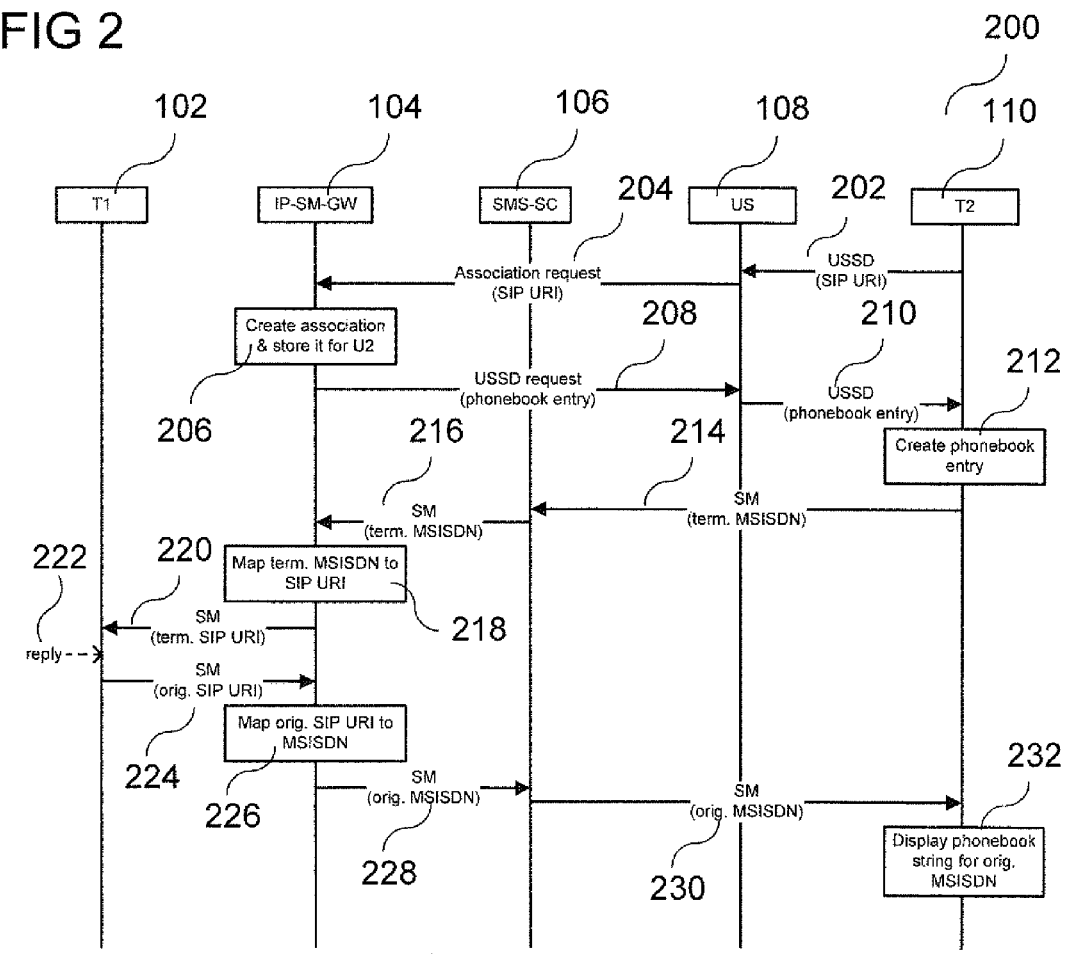
FIG. 2 shows a flow diagram illustrating a signaling flow in the communication system of FIG. 1, wherein a communication device with an MSISDN (Mobile Subscriber Integrated Services Digital Network Number) starts communication.

FIG. 2 shows a flow diagram 200 illustrating a signaling flow in the communication system of FIG. 1, wherein a communication device with an MSISDN starts communication. In the signaling flow 200 for SM transmission between end devices with and without an MSISDN with reply by the MSISDN-less end device, for clarity reasons, not all messages of USSD transactions may be shown.

User U2 may want to send an SM to user U1's end device T1 102. T1 102 may not be addressed by an MSISDN but by a SIP URI instead. Since user U2's end device T2 110 is a legacy phone, no SIP URI may be specified for the SM destination. In 202, the user U2 may first send USSD to his home operator's network. The USSD may contain a special character sequence and the SIP URI of T1 102.

When receiving the USSD from T2 110, the USSD server US 108 of user U2's home operator may know from the special character sequence included in the USSD that the SIP URI included in the USSD should be associated with a new MSISDN. The USSD server 108 may then in 204 request from the gateway IP-SM-GW 104 to create an association between the SIP URI and a new MSISDN and to store it for user U2.

After having created and stored the association for user U2 in 206, the gateway 104 may in 208 request to send USSD to user U2's end device T2 110 including a special character sequence for defining a new phonebook entry and including T1's 102 SIP URI and associated MSISDN. In 210, the USSD server US 108 may send USSD including the phonebook entry to T2 110.

When receiving the USSD, the end device T2 110 may create a new phonebook entry for the included MSISDN and may set the associated alphanumeric string to the included SIP URI in 212.

User U2 then may use the new phonebook entry to send an SM to T1 102. The SM may directly be sent to the switching center SMS-SC 106 in 214. Since the SM's terminating MSISDN may belong to the range of MSISDNs associated with SIP URIs, the switching center 106 may forward the SM to the gateway IP-SM-GW 104 in 216.

When receiving the SM, the gateway 104 may extract the originating MSISDN from the SM and may find that it belongs to user U2. Therefore, the gateway 104 may in 218 look up the association of the SM's terminating MSISDN stored for user U2. The gateway 104 may then in 220 send the SM to the SIP URI stored in the association, i.e. to user U1's end device T1 102.

After having received and read the SM, user U1 may in 222 press the reply button on his end device T1 102 to send an SM back to user U2's end device T2 110 in 224. T1 102 may automatically set the terminating address for the SM to the originating address of the received SM, i.e. to T2's 110 MSISDN.

T1 102 may in 224 send the SM to the gateway IP-SM-GW 104. The gateway 104 may find from the included terminating MSISDN that the SM is to be sent to user U2's end device T2 110. Therefore, the gateway 104 may in 226 map the SM's originating address to the MSISDN associated with T1's 102 SIP URI stored for user U2 and may forward the SM to the switching center SMS-SC 106 in 228.

The switching center 106 may in 230 send the SM to T2 110. When receiving the SM, T2 110 may extract the originating MSIDN from the SM and may in 232 display the associated alphanumeric string stored in T2's 110 phonebook, i.e. T1's 102 SIP URI as the sender for the SM.

Figure 3:
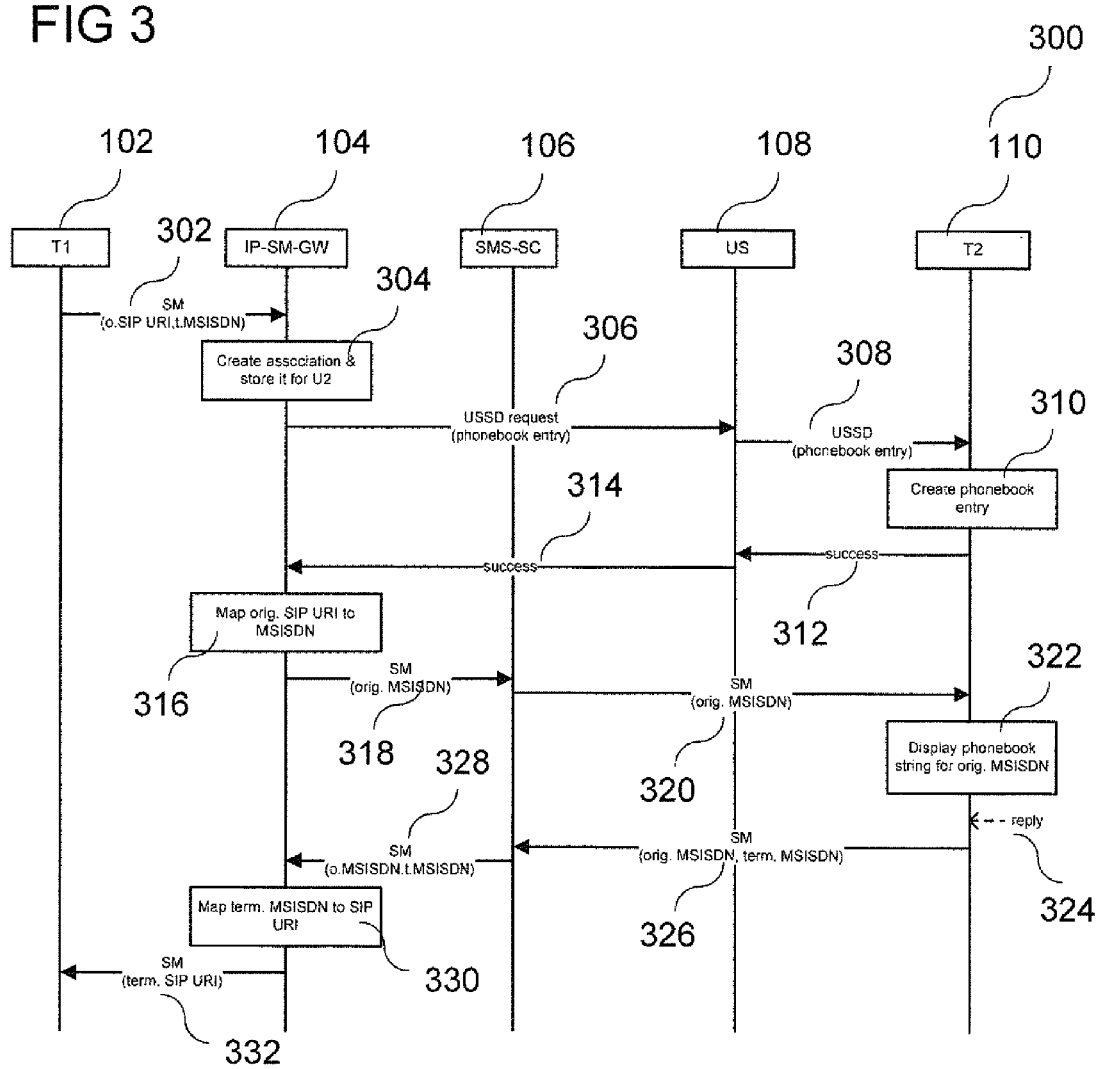
FIG. 3 shows a flow diagram illustrating a signaling flow in the communication system of FIG. 1, wherein a communication device without an MSISDN starts communication.

FIG. 3 shows a flow diagram 300 illustrating a signaling flow in the communication system of FIG. 1, wherein a communication device without an MSISDN may start communication. In the signaling flow 300 for SM transmission between end devices with and without an MSISDN with reply by the end device with an MSISDN, for clarity reasons, not all messages of USSD transactions may be shown.

In the example shown in FIG. 3, the same communication system as for the previous example shown in FIG. 2 may be assumed.

In this example, user U1 may send an SM to user U2's end device T2. The SM may directly be sent to the gateway IP-SM-GW 104 in 302. The gateway 104 may extract the SM's originating address, i.e. T1's 102 SIP URI, and the SM's terminating MSISDN, i.e. T2's 110 MSISDN, from the SM in 304. The gateway 104 may find that no association is being stored associating the originating SIP URI for the terminating MSISDN's user U2. Therefore, the gateway 104 may create an association with a new MSISDN and may store the association for user U2 in 304.

Then the gateway 104 may in 306 request from USSD server US 108 to send USSD to T2 110 for creating a new phonebook entry on end device T2 110 for the association.

The USSD server 108 may send the USSD to T2 110 in 308 and may in 312 receive a confirmation of successful phonebook entry creation from T2 110 within the USSD transaction, for example after T2 110 has created the phonebook entry in 310. The USSD server 108 may then notify the gateway 104 of the successful creation in 314.

After having received the notification, the gateway IP-SM-GW 104 may in 316 map the SM's originating SIP URI to the new associated MSISDN and may forward the SM to the switching center SMS-SC 106 in 318. The switching center 106 may send the SM to T2 110 in 320.

When receiving the SM, T2 110 may extract the originating MSISDN from the SM and may in 322 display the associated alphanumeric string stored in T2's 110 phonebook, i.e. T1's 102 SIP URI as the sender for the SM.

After having read the SM, user U2 may press the reply button in 324 on his end device T2 110 to send an SM back to user U1's end device T1 102. T2 110 may automatically set the terminating address for the SM to the originating address of the received SM, i.e. to T1's 102 MSISDN.

The SM may in 326 directly be sent to the switching center SMS-SC 106. Since the SM's terminating MSISDN may belong to the range of MSISDNs associated with SIP URIs, the switching center 106 may forward the SM to the gateway IP-SM-GW 104 in 328.

When receiving the SM, the gateway 104 may in 330 extract the originating MSISDN from the SM and may find that it belongs to user U2. Therefore, the gateway 104 may look up the association of the SM's terminating MSISDN stored for user U2. The gateway 104 may then in 332 send the SM to the SIP URI stored in the association, i.e. to user U1's end device T1 102.

Figure 4:
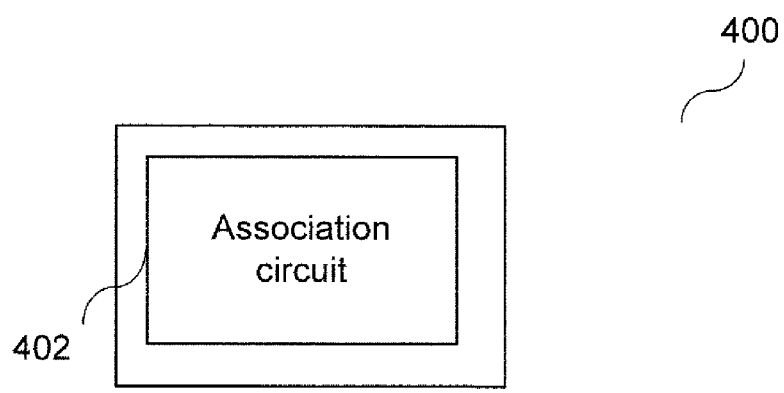
FIG. 4 shows a server with an association circuit.

FIG. 4 shows a server 400 with an association circuit. The server 400 may include an association circuit 402 configured to associate with a first address according to a first address scheme according to a communication control protocol, by which a communication device may be addressed, a second address according to a second address scheme, by which the communication device may not be addressed. In other words: the association circuit 402 may be configured to establish an association of the second address according to the second address scheme, by which the communication device may not be addressed, with the first address according to the first address scheme according to a communication control protocol, by which the communication device may be addressed.

The second address scheme may be an address scheme according to a mobile subscriber integrated service digital network number.

The association circuit 402 may further be configured to associate with the first address the second address based on an instruction from another communication device.

The instruction from the other communication device may be an instruction according to unstructured supplementary service data.

The association circuit 402 may further be configured to associate with the first address the second address specific for another communication device.

The association circuit 402 may further be configured to associate with the first address the second address based on an instruction from the communication device.

The association circuit 402 may further be configured to associate with the first address the second address based on a data sent from the communication device to another communication device and addressed according to the second address scheme.

The server may be an internet protocol short message gateway.

The communication control protocol may be a session initiation protocol.

Figure 5:
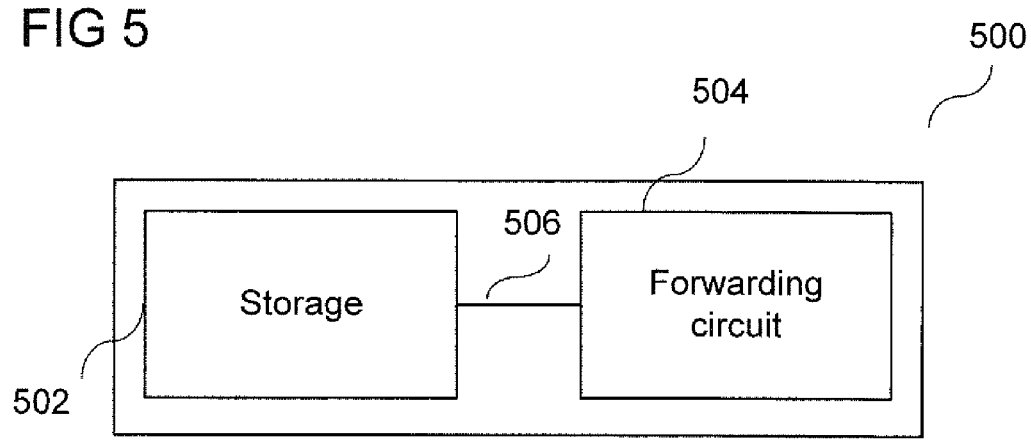
FIG. 5 shows a server with a storage and a forwarding circuit.

FIG. 5 shows a server 500 with a storage and a forwarding circuit. The server 500 may include: a storage 502 configured to store an association of a first address according to a first address scheme according to a communication control protocol, by which a communication device may be addressed, with a second address according to a second address scheme, by which the communication device may not be addressed; and a forwarding circuit 504 configured to forward data addressed to the second address to the communication device using the first address based on the stored association. The storage 502 and the forwarding circuit 504 may be coupled with each other, e.g. via a connection 506, for example an optical connection or an electrical connection, such as e.g. a cable or a computer bus or via any other suitable electrical connection to exchange electrical signals.

The second address scheme may be an address scheme according to a mobile subscriber integrated service digital network number.

The storage 502 may further be configured to store the association specific for another communication device.

The data may be a short message.

The server may be an internet protocol short message gateway.

The communication control protocol may be a session initiation protocol.

Figure 6:
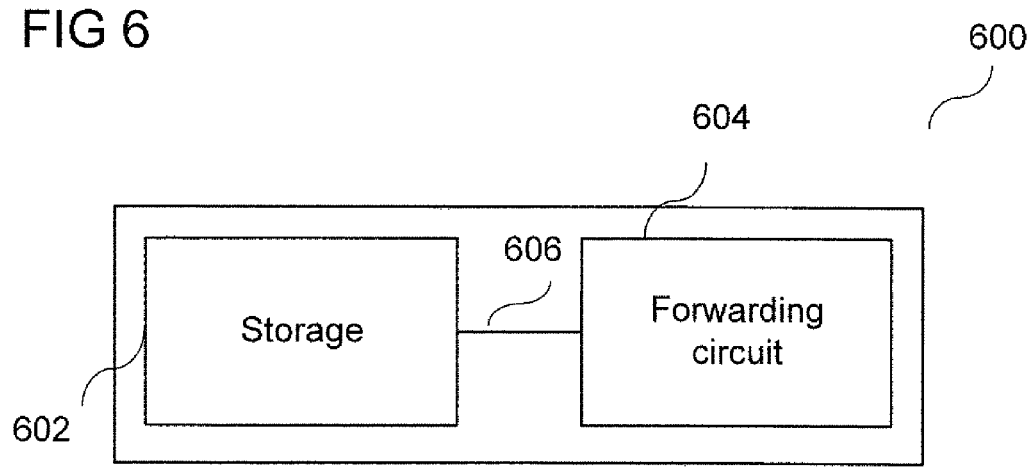
FIG. 6 shows a server with a storage and a forwarding circuit (wherein the forwarding circuit may forward data in the opposite direction compared to the forwarding circuit of FIG. 5)

FIG. 6 shows a server 600 with a storage and a forwarding circuit (wherein the forwarding circuit may forward data in the opposite direction compared to the forwarding circuit of FIG. 5). The server 600 may include: a storage 602 configured to store an association of a first address according to a first address scheme according to a communication control protocol, by which a communication device may be addressed, with a second address according to a second address scheme, by which the communication device may not be addressed; and a forwarding circuit 604 configured to forward data received from the communication device using the second address as a sender address based on the association. The storage 602 and the forwarding circuit 604 may be coupled with each other, e.g. via a connection 606, for example an optical connection or an electrical connection, such as e.g. a cable or a computer bus or via any other suitable electrical connection to exchange electrical signals.

The second address scheme may be an address scheme according to a mobile subscriber integrated service digital network number.

The storage 602 is further configured to store the association specific for another communication device.

The data may be a short message.

The server 600 may be an internet protocol short message gateway.

The communication control protocol may be a session initiation protocol.

Figure 7:
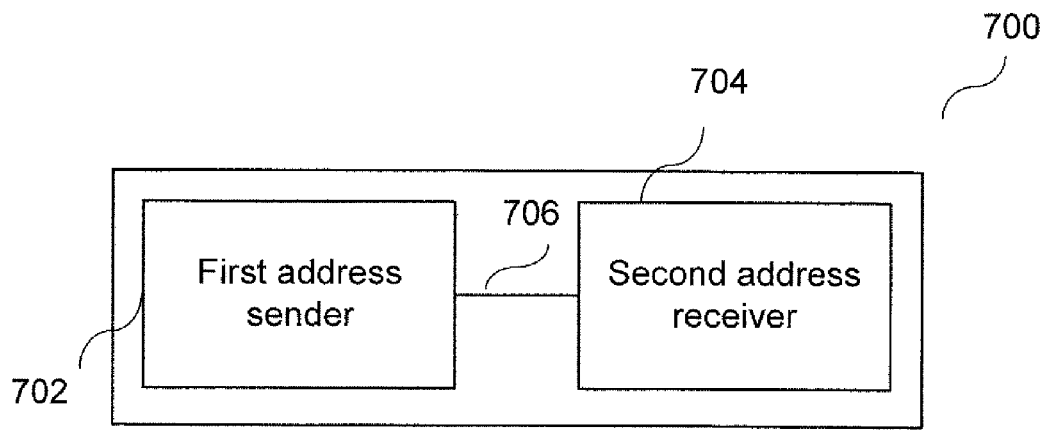
FIG. 7 shows a communication device.

FIG. 7 shows a communication device 700. The communication device 700 may include: a first address sender 702 configured to send to a server a first address according to a first address scheme according to a communication control protocol by which another communication device may be addressed, wherein the first address scheme is not used by the communication device for communication services; and a second address receiver 704 configured to receive in response to the sent first address from the server a second address according to a second address scheme by which the other communication device may not be addressed, wherein the second address is associated with the other communication device, wherein the second address scheme is used by the communication device for communication services. The first address sender 702 and the second address receiver 704 may be coupled with each other, e.g. via a connection 706, for example an optical connection or an electrical connection, such as e.g. a cable or a computer bus or via any other suitable electrical connection to exchange electrical signals.

The first address sender 702 may further be configured to send the first address according to unstructured supplementary service data.

The second address receiver 704 may further be configured to receive the second address according to unstructured supplementary service data.

The communication control protocol may be a session initiation protocol.

Figure 8:
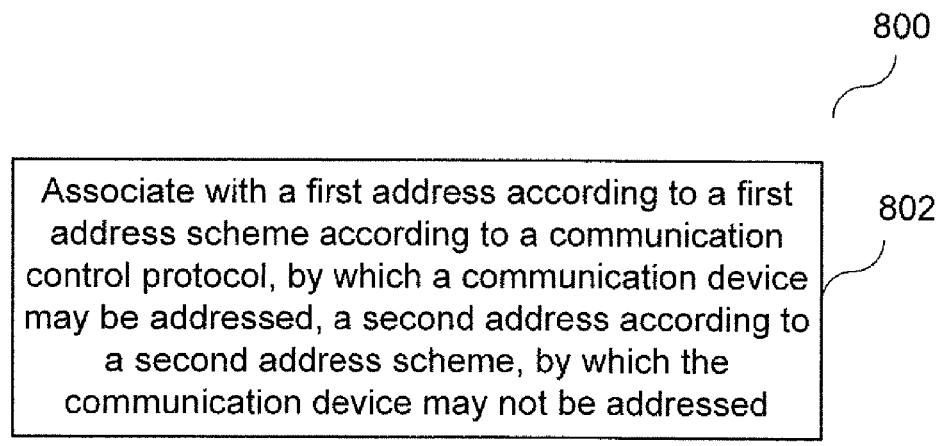
FIG. 8 shows a flow diagram illustrating a method for controlling a server with an association circuit.

FIG. 8 shows a flow diagram 800 illustrating a method for controlling a server with an association circuit. In 802, for example an association circuit of the server may associate with a first address according to a first address scheme according to a communication control protocol, by which a communication device may be addressed, a second address according to a second address scheme, by which the communication device may not be addressed.

The second address scheme may be an address scheme according to a mobile subscriber integrated service digital network number.

The association circuit may associate with the first address the second address based on an instruction from another communication device.

The instruction from the other communication device may be an instruction according to unstructured supplementary service data.

The association circuit may associate with the first address the second address specific for another communication device.

The association circuit may associate with the first address the second address based on an instruction from the communication device.

The association circuit may associate with the first address the second address based on a data sent from the communication device to another communication device and addressed according to the second address scheme.

The server may be an internet protocol short message gateway.

The communication control protocol may be a session initiation protocol.

Figure 9:
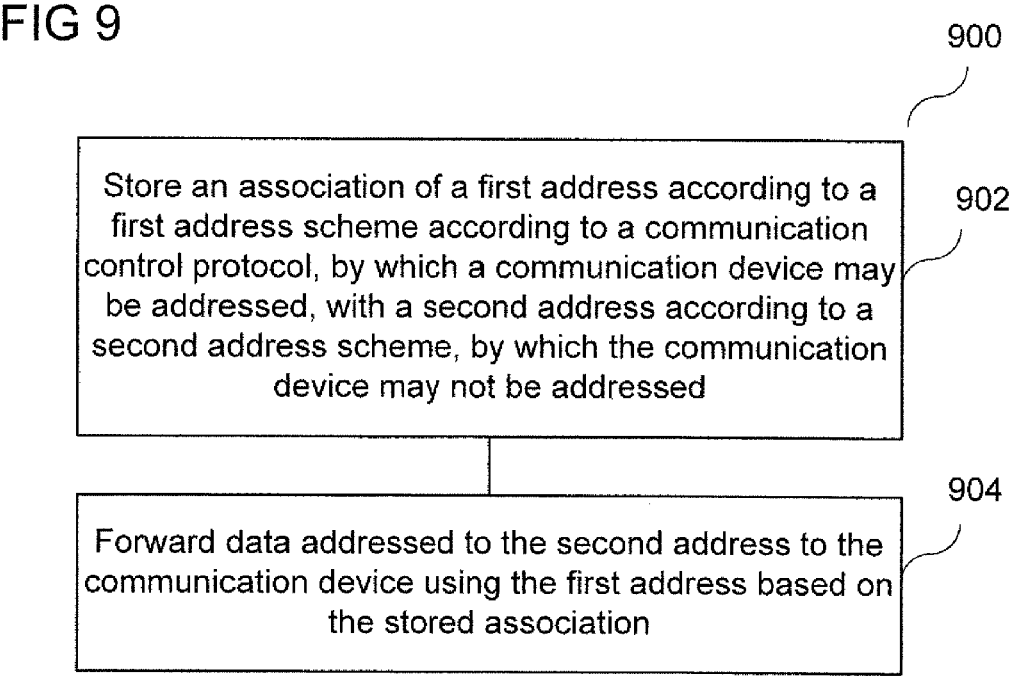
FIG. 9 shows a flow diagram illustrating a method for controlling a server with a storage and a forwarding circuit.

FIG. 9 shows a flow diagram 900 illustrating a method for controlling a server with a storage and a forwarding circuit. In 902, for example a storage of the server may store an association of a first address according to a first address scheme according to a communication control protocol, by which a communication device may be addressed, with a second address according to a second address scheme, by which the communication device may not be addressed. In 904, for example a forwarding circuit of the server may forward data addressed to the second address to the communication device using the first address based on the stored association.

The second address scheme may be an address scheme according to a mobile subscriber integrated service digital network number.

The storage may further store the association specific for another communication device.

The data may be a short message.

The server may be an internet protocol short message gateway.

The communication control protocol may be a session initiation protocol.

Figure 10:
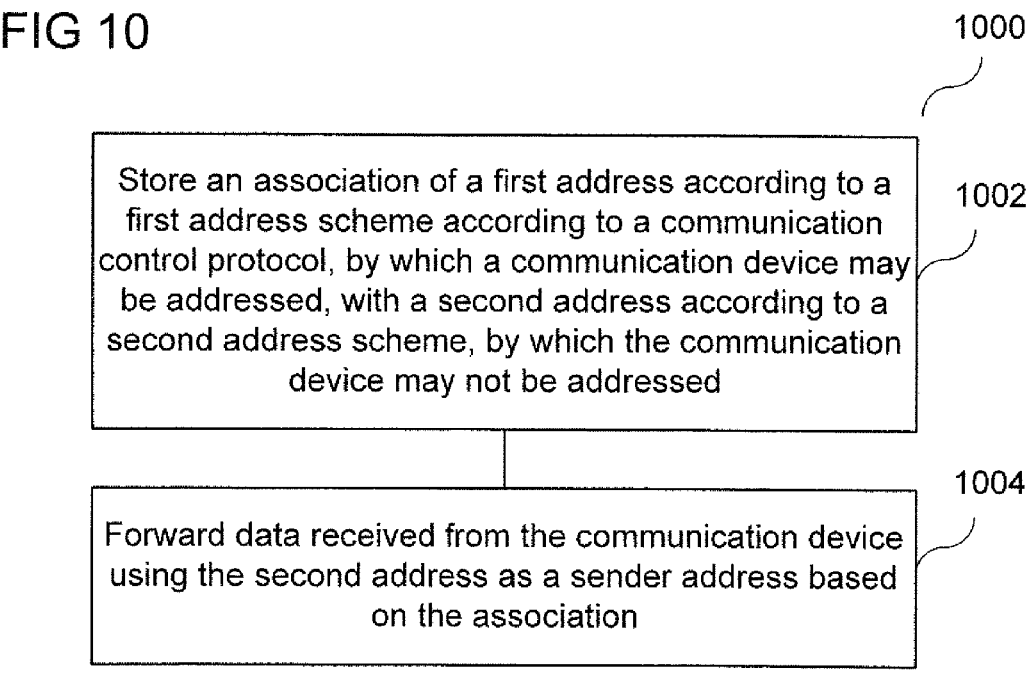
FIG. 10 shows a flow diagram illustrating a method for controlling a server with a storage and a forwarding circuit (wherein the forwarding circuit may forward data in the opposite direction compared to the forwarding circuit of FIG. 9)

FIG. 10 shows a flow diagram 1000 illustrating a method for controlling a server with a storage and a forwarding circuit (wherein the forwarding circuit may forward data in the opposite direction compared to the forwarding circuit of FIG. 9). In 1002, a storage of the server may store an association of a first address according to a first address scheme according to a communication control protocol, by which a communication device may be addressed, with a second address according to a second address scheme, by which the communication device may not be addressed. In 1004, a forwarding circuit of the server may forward data received from the communication device using the second address as a sender address based on the association.

The second address scheme may be an address scheme according to a mobile subscriber integrated service digital network number.

The storage may store the association specific for another communication device.

The data may be a short message.

The server may be an internet protocol short message gateway.

The communication control protocol may be a session initiation protocol.

FIG. 11 shows a flow diagram 1100 illustrating a method for controlling a communication device. In 1102, a first address sender of the communication device may send to a server a first address according to a first address scheme according to a communication control protocol by which another communication device may be addressed, wherein the first address scheme is not used by the communication device for communication services. In 1104, a second address receiver of the communication device may receive in response to the sent first address from the server a second address according to a second address scheme by which the other communication device may not be addressed, wherein the second address is associated with the other communication device, wherein the second address scheme is used by the communication device for communication services.

The first address sender may send the first address according to unstructured supplementary service data.

The second address receiver may receive the second address according to unstructured supplementary service data.

The communication control protocol may be a session initiation protocol.

USSD for creating associations or for creating phonebook entries may be transmitted in concatenated USSD messages if a single USSD message is too short for the data to be transmitted.

Instead of storing associations and mapping addresses in the IP short message gateway, association storage and mapping may be done by a special additional network entity or by the USSD server.

Instead of sending USSD for creating phonebook entries for associations, the association creating network entity may just inform the user about new associations e.g. per USSD or SMS.

End devices' SMS applications may automatically request a new association for SM destinations not yet associated when sending an SM. Suitable applications may accept other addresses than MSISDNs e.g. SIP URIs. The SMS application may be a downloadable app (or application).

MSISDNs associated with non-MSISDN addresses may include or may consist of several parts representing the operator, the subscriber and the non-MSISDN address. For example, the first part of the MSISDN may be fixed for the same operator, the middle part may be fixed for the same subscriber and the last part may be dependent on the associated non-MSISDN address. The middle subscriber part may be the same for different operators. The last part may be chosen based on the time when the association is being created. Table 1 shows the scheme.

TABLE 1

Possible partitioning of associated MSISDNs.

| 0 1 1 1 1 1 | 2 2 2 2 2 | 3 3 3 3 3 |
|---|---|---|
| network operator number | subscriber number | associated address number |

In addition to USSD commands for creating associations or phonebook entries, USSD may also be used to retrieve associations or to delete associations stored in the network or in end devices' phonebooks.

When an end device is requesting an association per USSD, the end device may propose an MSISDN or part of an MSISDN to be associated. In this case, the proposed MSISDN or part of an MSISDN may be included in the USSD. A proposed part of an MSISDN may be the last part and the first part may be fixed or chosen by the network.

When an end device proposes an MSISDN or part of an MSISDN that is already being used, then the already existing association for the MSISDN or part of an MSISDN may be replaced with the new requested association.

Associations may always use the same MSISDN. In this case, associations may last until they are replaced by a new association request or until they are used once.

An end device's phonebook application may automatically request associations when addresses other than MSISDNs are being input for a new phonebook entry, e.g. when a SIP URI is being input. In this case, the alphanumeric string of the phonebook entry may be the alphanumeric string input for the entry or the alphanumeric string input for the entry appended by the non-MSISDN address in brackets.

If a user uses an end device for the first time with his subscription, then the device's phonebook may be automatically updated per USSD by the network with the associations stored for the user.

An end device's phonebook may be updated by the network per USSD when requested from the end device per USSD.

Phonebook entries defined by the network may be stored on a UICC (Universal Integrated Circuit Card), e.g. on a SIM (Subscriber Identity Module).

Devices and methods may also be used for other communications than SMS, e.g. for voice or other services.

Devices and methods may also be used with other address types than MSISDNs and SIP URIs.

Devices and methods may also be used with other protocols than USSD for association creation and phonebook entry creation.

The server and/or the communication device and/or the other communication device may be configured to send and/or receive data according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN;

an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A server comprising:
   an association circuit configured to associate with a first address according to a first address scheme according to a communication control protocol, by which a communication device is to be addressed, a second address according to a second address scheme, by which the communication device is not to be addressed based on an instruction from the communication device and based on data sent from the communication device to another communication device according to the second address scheme; and
   a transmit circuit configured to cause transmit information that associates the first address of the communication device with the second address for creation of a phonebook entry at the another communication device.

2. The server of claim 1, wherein the second address scheme is an address scheme according to a mobile subscriber integrated service digital network number.

3. The server of claim 1, wherein the association circuit is further configured to associate with the first address the second address based on an instruction from another communication device.

4. The server of claim 3, wherein the instruction from the other communication device is an instruction according to unstructured supplementary service data.

5. The server of claim 1, wherein the association circuit is further configured to associate with the first address the second address specific for another communication device.

6. The server of claim 1, wherein the server is an internet protocol short message gateway.

7. The server of claim 1, wherein the communication control protocol is a session initiation protocol.

8. A server comprising:
   a storage configured to store an association of a first address according to a first address scheme according to a communication control protocol, by which a communication device is to be addressed, with a second address according to a second address scheme, by which the communication device is not to be addressed, wherein the association is based on an instruction from the communication device and based on data sent from the communication device to another communication device according to the second address scheme; and
   a forwarding circuit configured to forward data addressed to the second address to the communication device using the first address based on the stored association,
   wherein the server is to send information that associates the first address of the communication device with the second address for creation of a phonebook entry at the communication device.

9. The server of claim 8, wherein the second address scheme is an address scheme according to a mobile subscriber integrated service digital network number.

10. The server of claim 8, wherein the storage is further configured to store the association specific for another communication device.

11. The server of claim 8, wherein the data is a short message.

12. The server of claim 8, wherein the server is an internet protocol short message gateway.

13. The server of claim 8, wherein the communication control protocol is a session initiation protocol.

14. A server comprising:
   a storage configured to store an association of a first address according to a first address scheme according to a communication control protocol, by which a communication device is to be addressed, with a second address according to a second address scheme, by which the communication device is not to be addressed, wherein the association is based on an instruction from the communication device and based on data sent from the communication device to another communication device according to the second address scheme; and a forwarding circuit configured to forward data received from the communication device using the second address as a sender address based on the association, wherein the server is to send information that associates the first address of the communication device with the second address for creation of a phonebook entry at another communication device.

15. The server of claim 14, wherein the second address scheme is an address scheme according to a mobile subscriber integrated service digital network number.

16. The server of claim 14, wherein the storage is further configured to store the association specific for another communication device.

17. The server of claim 14, wherein the data is a short message.

18. The server of claim 14, wherein the server is an internet protocol short message gateway.

19. The server of claim 14, wherein the communication control protocol is a session initiation protocol.

20. A communication device, comprising:

transmit circuitry configured to send to a server a first address according to a first address scheme according to a communication control protocol by which another communication device is to be addressed and an instruction to associate with the first address a second address according to a second address scheme, and further to send data to the other communication device according to the second address scheme, wherein the first address scheme is not used by the communication device for communication services; and receive circuitry configured to receive in response to the sent first address from the server information associated with creation of a phonebook entry associated with the other communication device and the second address, associated with the phonebook entry, according to the second address scheme by which the other communication device is not to be addressed, wherein the second address is associated with the other communication device, wherein the second address scheme is used by the communication device for communication services.

21. The communication device of claim 20, wherein the transmit circuitry is further configured to send the first address according to unstructured supplementary service data.

22. The communication device of claim 20, wherein the receive circuitry is further configured to receive the second address according to unstructured supplementary service data.

23. The communication device of claim 20, wherein the communication control protocol is a session initiation protocol.

* * * * *